Jan. 31, 1967            R. E. HALL            3,301,401
SECONDARY WASTE WATER TREATMENT APPARATUS
Filed May 8, 1964
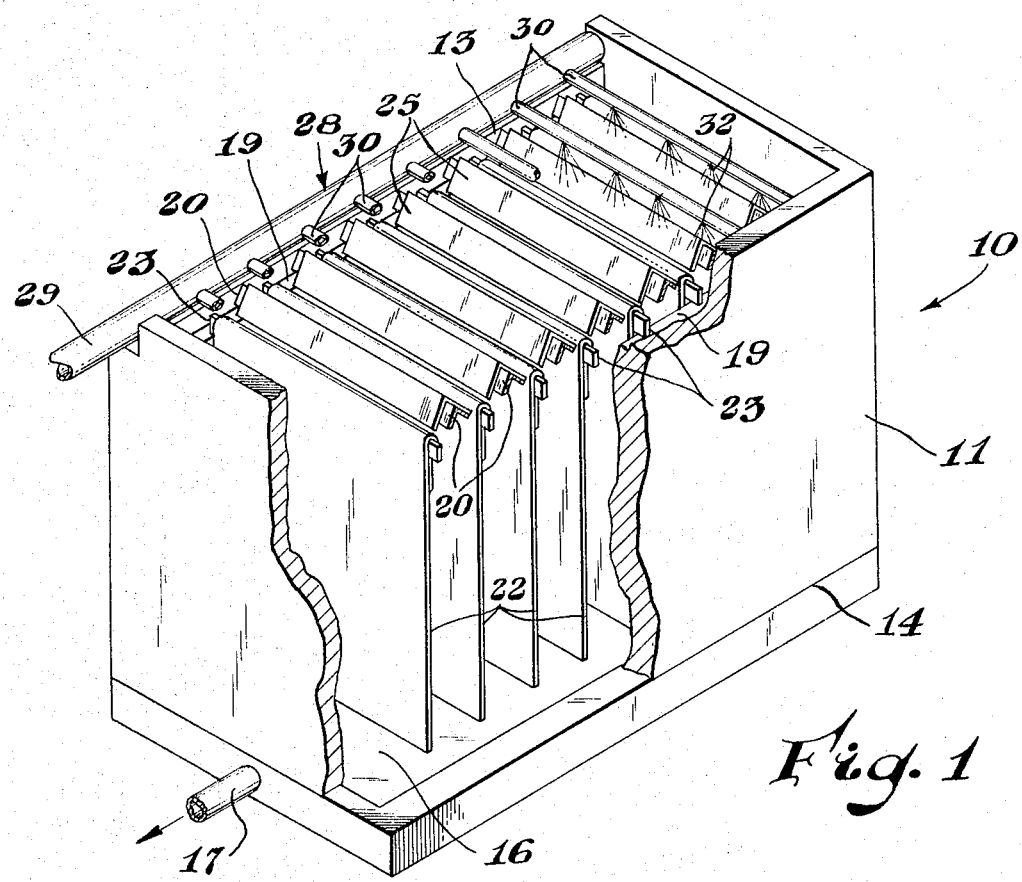
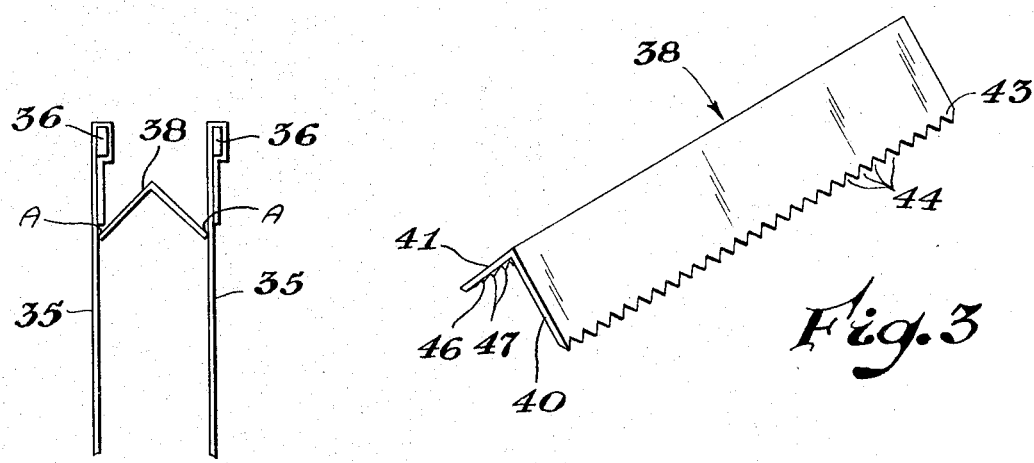
INVENTOR.
Robert E. Hall
BY
AGENT United States Patent Office 3,301,401
Patented Jan. 31, 1967

3,301,401
SECONDARY WASTE WATER TREATMENT APPARATUS
Robert E. Hall, Midland, Mich., assignor to The Dow Chemical Company, Midland, Mich., a corporation of Delaware
Filed May 8, 1964, Ser. No. 365,962
3 Claims. (Cl. 210—150)

This invention relates to apparatus for the treatment of secondary waste water. It more particularly relates to an improved apparatus of the hanging sheet variety.

In apparatus for the treatment of waste water whereby the water to be treated is passed over the surface of vertically hanging sheets having a biological slime thereon for the removal of organic materials in the water by biological oxidation processes there has been some difficulty encountered with free fall when spray type distributors are utilized.

It is an object of this invention to provide an improved apparatus for the treatment of waste water.

A further object of this invention is to provide a hanging sheet apparatus for the biological oxidation of wastes whereby the problem of free fall is substantially eliminated.

A further object of this invention is to provide an apparatus for the treatment of waste waters wherein the maximum surfaces of the sheets are utilized for the treatment of the waste water.

These benefits and other advantages in accordance with the present invention are readily achieved in an apparatus for the secondary treatment of waste water comprising an enclosure, the enclosure having an upper end and a lower end, a plurality of vertically disposed sheets, the sheets being in substantially parallel arrangement, a liquid distributor comprising means to provide a liquid onto the upper portions of the sheet, a liquid discharge at the lower end of the enclosure adapted to remove the treated water, the improvement which comprises providing adjacent the upper portion of each of the sheets a baffle, the baffle being positioned in such a manner that the falling spray of liquid is deflected onto the upper portion of each of the hanging sheets and is prevented from falling between the sheets.

Further features and advantages of the invention will become more apparent from the following specification when taken in connection with the drawing wherein:

FIGURE 1 is a schematic representation of an apparatus in accordance with the invention;
FIGURE 2 depicts an alternate positioning of a baffle in the device of FIGURE 1;
FIGURE 3 is an isometric view of the baffle of FIGURE 2.

In FIGURE 1 there is illustrated a schematic cutaway view of a water treating apparatus generally designated by the reference numeral 10. The apparatus 10 comprises an enclosure 11 having an upper open end 13 and a lower or discharge end 14. The discharge end 14 defines a cavity 16 which is in full communication with a discharge line 17. The upper end of the enclosure 11 defines a sheet support retaining means 19 and a deflector retaining means 20. Within the space defined by the enclosure 11 are disposed a plurality of vertically hanging sheets 22. Each of the sheets 22 is dependent from a sheet support 23. The sheet supports 23 in turn are supported by the sheet support retainer 19 disposed at opposite ends of the enclosure 11. A plurality of deflectors or baffles 25 are positioned adjacent to the upper portions of the sheets 22 and maintained in position by the deflector retaining means 20. A liquid distributor 28 is positioned above the upper end 13 of the enclosure 11. The liquid distributor 28 comprises a header 29 having a plurality of arms 30 which deliver a spray 32 onto the deflectors 25 and the sheets 22. The spray 32, on falling toward the sheets 22, encounters the upper portion of the sheet 22 or support 23 or the deflectors 25. The baffles 25 direct the liquid onto the upper portion of the sheet effectively preventing free fall of the spray between the sheets. The baffles 25 extend for a distance equal to or greater than the gap between adjacent sheets. In this manner low pressure stationary sprays may be utilized and it is unnecessary to provide the spray with a horizontal component of motion to prevent free fall of the liquid between the sheets and the liquid contacts the entire surface of sheet and all of liquid contacts the sheet at its uppermost portion thus providing the maximum vertical path and assuring maximum use of the available surface.

FIGURE 2 depicts an alternate arrangement which may be utilized for the installation of baffles wherein the sheet supports and the baffles are readily carried by the same support. The embodiment of FIGURE 2 comprises a plurality of hanging sheets 35 which are supported by the sheet supports 36. The baffle 38 is disposed between the sheets 35 and in contact therewith adjacent the sheet supports at the locations designated by A.

FIGURE 3 is an isometric view of the baffle 38 which comprises a first leg 40 and a second leg 41.

The leg 40 terminates in the edge 43 which defines a plurality of serrations 44. Similarly the leg 41 terminates in the edge 46 which defines a plurality of like serrations 47. The points between the serrations are in contact with the hanging sheets 35 and as the liquid strikes the legs 40 or 41 it is directed toward the edges 43 and 46 respectively, passes through the serrations 44 or 47 and onto the surface of the sheets 35. Effectively free fall is totally prevented and optimum distribution of the liquid over the surfaces of the sheets is accomplished.

As is apparent from the foregoing specification, the manufacture of the present invention is susceptible of being embodied with various alterations and modifications which may differ particularly from those that have been described in the preceding specificatioin and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. In a biological oxidation apparatus for the secondary treatment of waste water comprising an enclosure, the enclosure having an upper and a lower end, a plurality of vertically disposed spaced apart sheets defining spaces therebetween, the sheets being in substantially parallel arrangement and having upper ends and lower ends, a liquid distributor comprising means to provide a liquid onto upper ends of the sheets, a liquid discharge at the lower end of the enclosure adapted to remove the treated water, the improvement which comprises
 a plurality of baffles,
  the baffles being positioned within the space adjacent the upper end of the vertically disposed sheets,
  the baffles comprising elongate members having two generally parallel edges, the edges having
   serrations, the serrations having points, the points of the serrations of each edge being disposed against a hanging sheet, each baffle defining a surface lying between the edges which is remotely disposed from the adjacent sheets relative to the edges and adapted to cause liquid falling thereon to be deflected to the edges, the baffle being positioned in such a manner that the falling spray of liquid is deflected onto the upper portion of each of the hanging sheets and is prevented from falling between the sheets.

2. The apparatus of claim 1 wherein the surface of the baffle is divided generally equally into two portions, each of the portions adapted to deflect the liquid to the first edge and the second edge respectively.

3. The apparatus of claim 2 wherein the baffle has a cross sectional configuration of an inverted V.

References Cited by the Examiner

UNITED STATES PATENTS

| | | | |
|---|---|---|---|
| 386,777 | 7/1888 | Griesser | 261—112 |
| 1,139,053 | 5/1915 | Murray et al. | 261—112 X |
| 3,231,490 | 1/1966 | Fry | 210—150 X |

SAMIH N. ZAHARNA, *Primary Examiner.*

REUBEN FRIEDMAN, *Examiner.*

F. SPEAR, *Assistant Examiner.*